May 21, 1935.  S. T. HART ET AL  2,002,009
CONVEYER SYSTEM
Filed Dec. 30, 1930   11 Sheets-Sheet 1
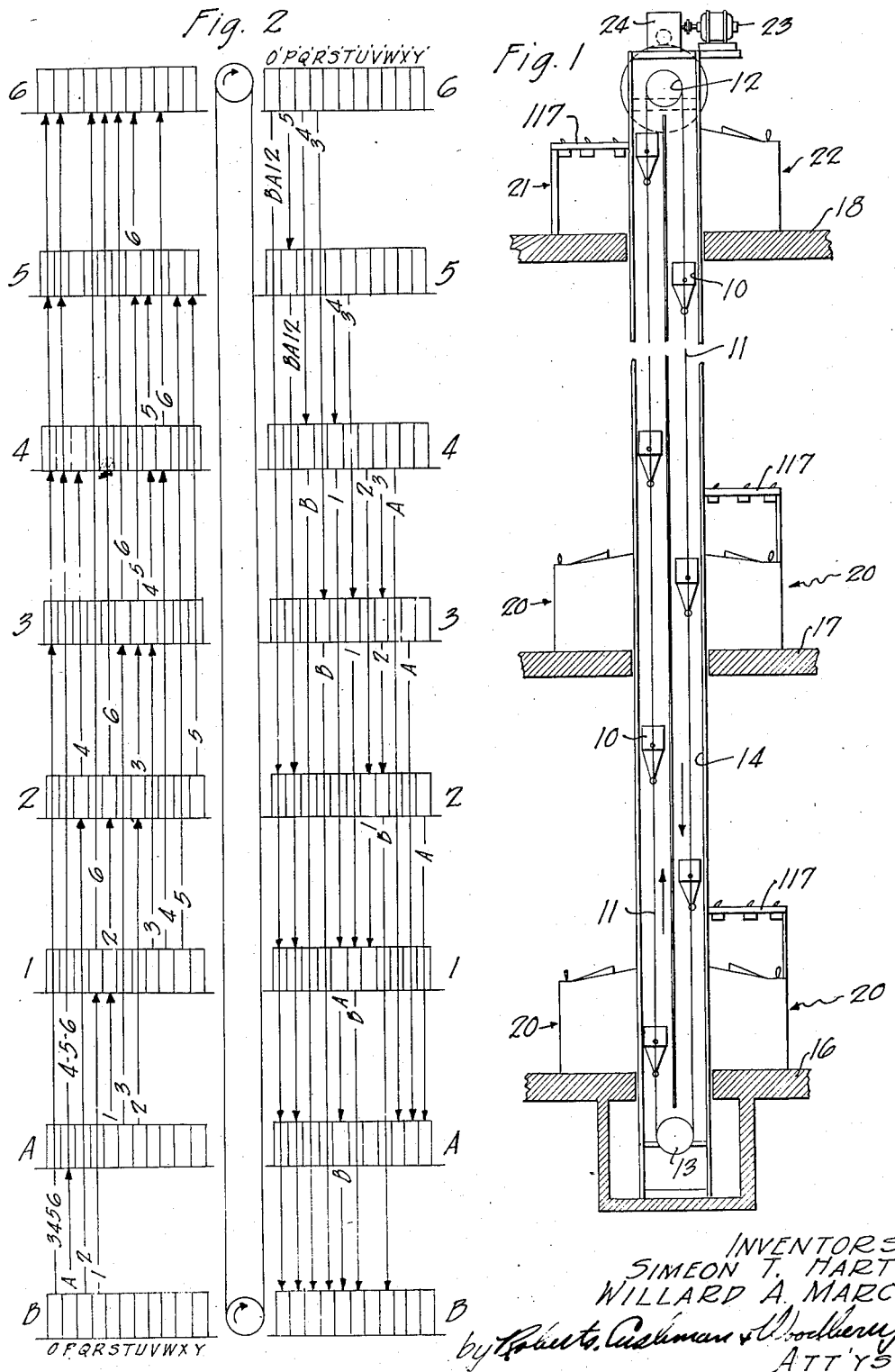
INVENTORS
SIMEON T. HART
WILLARD A. MARCY
by Roberts, Cushman & Woodberry
ATT'YS May 21, 1935.  S. T. HART ET AL  2,002,009
CONVEYER SYSTEM
Filed Dec. 30, 1930  11 Sheets-Sheet 2

INVENTORS
SIMEON T. HART
WILLARD A. MARCY
ATT'YS

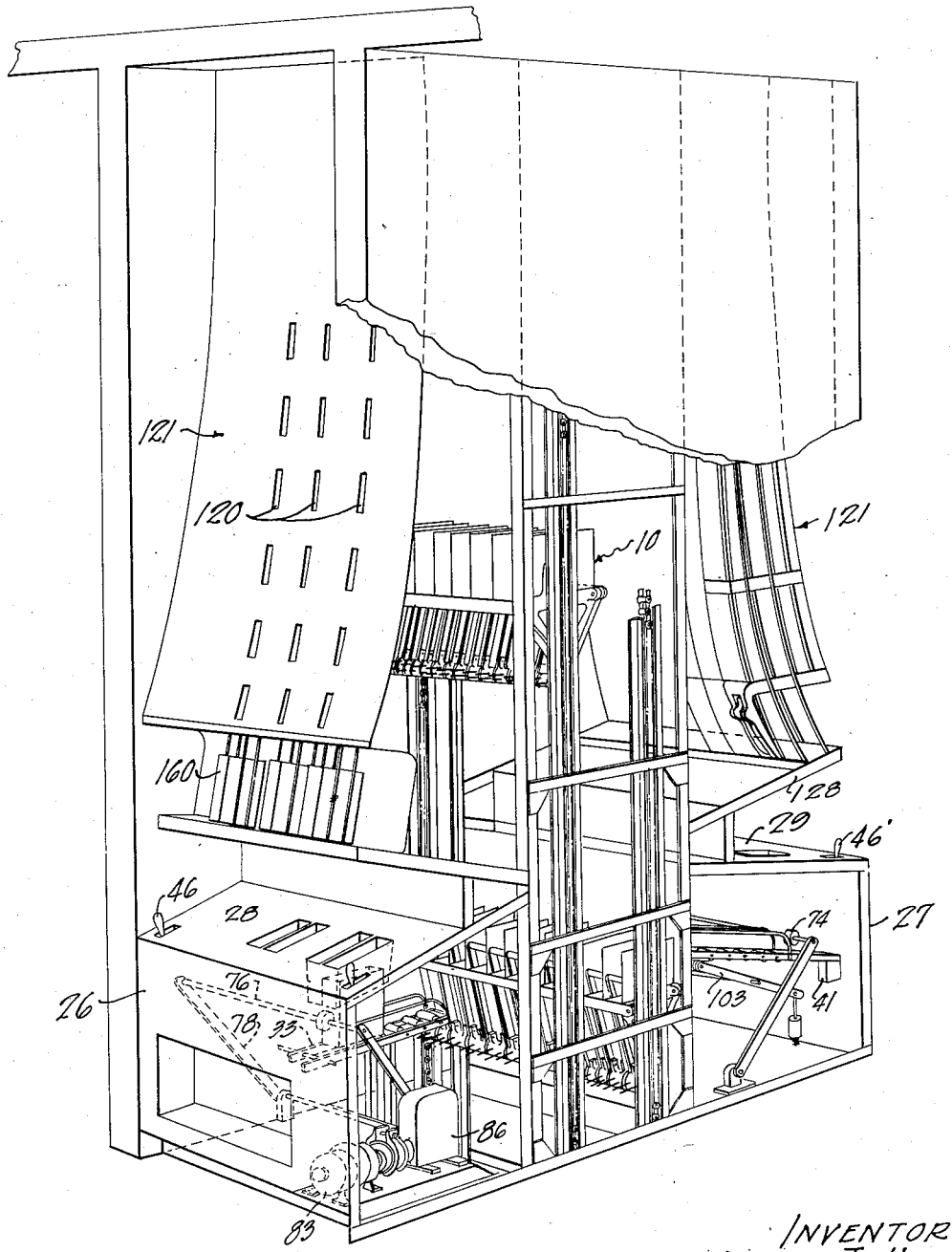

May 21, 1935.　　　S. T. HART ET AL　　　2,002,009
CONVEYER SYSTEM
Filed Dec. 30, 1930　　　11 Sheets-Sheet 4
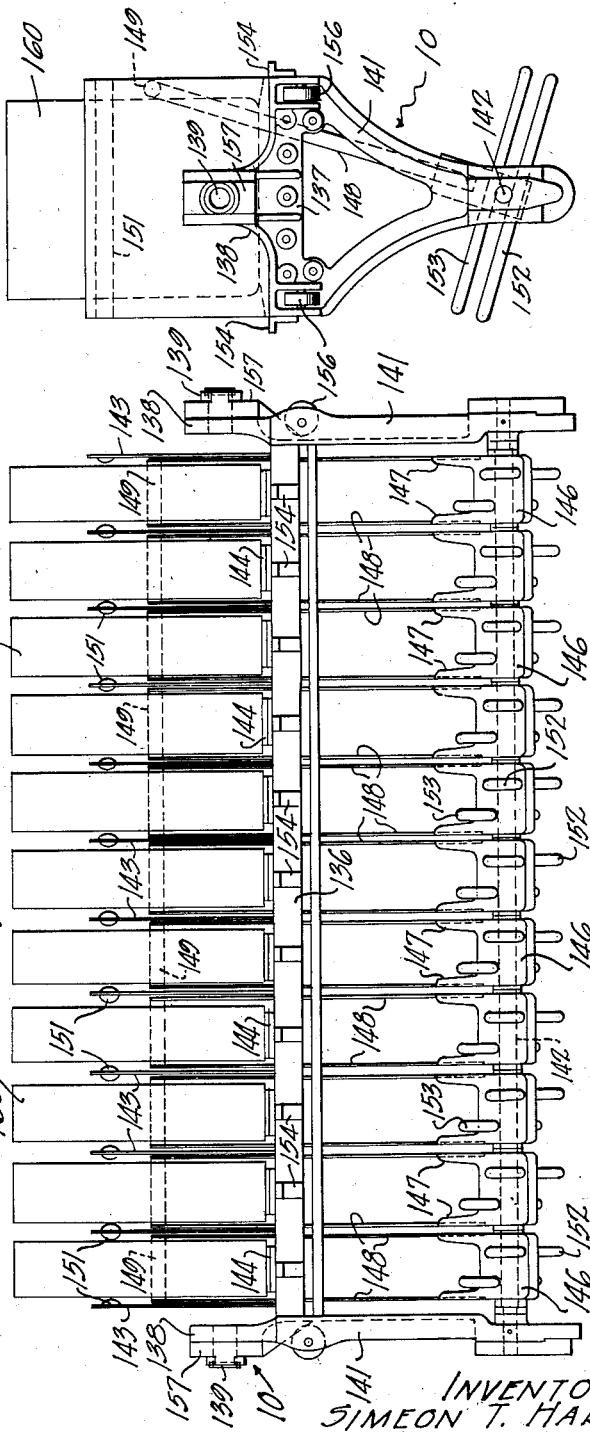
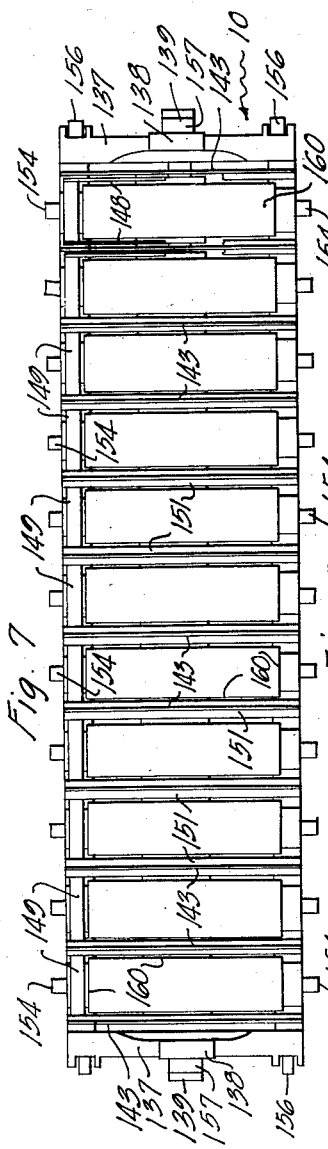
INVENTORS
SIMEON T. HART
WILLARD A. MARCY
ATT'YS

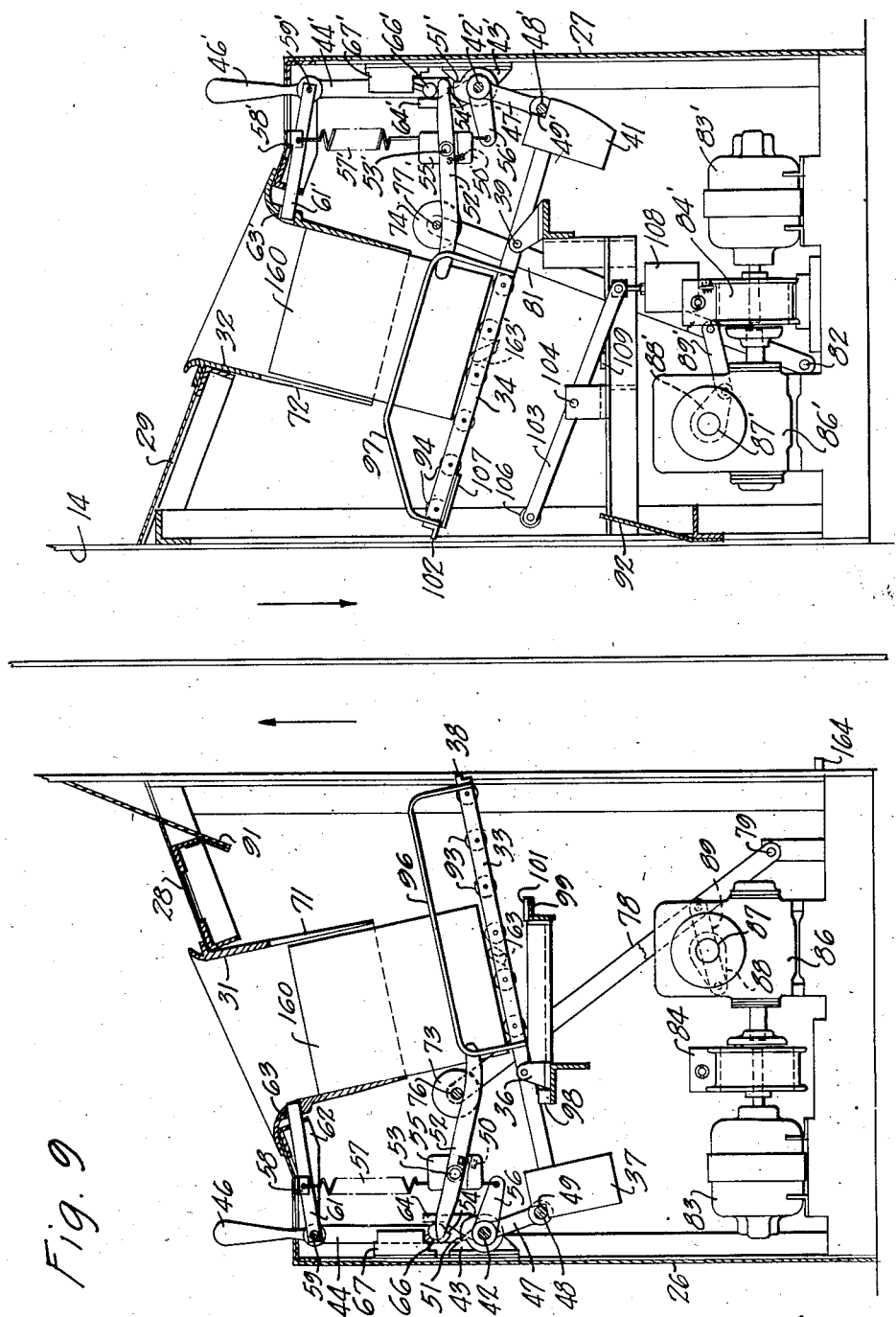

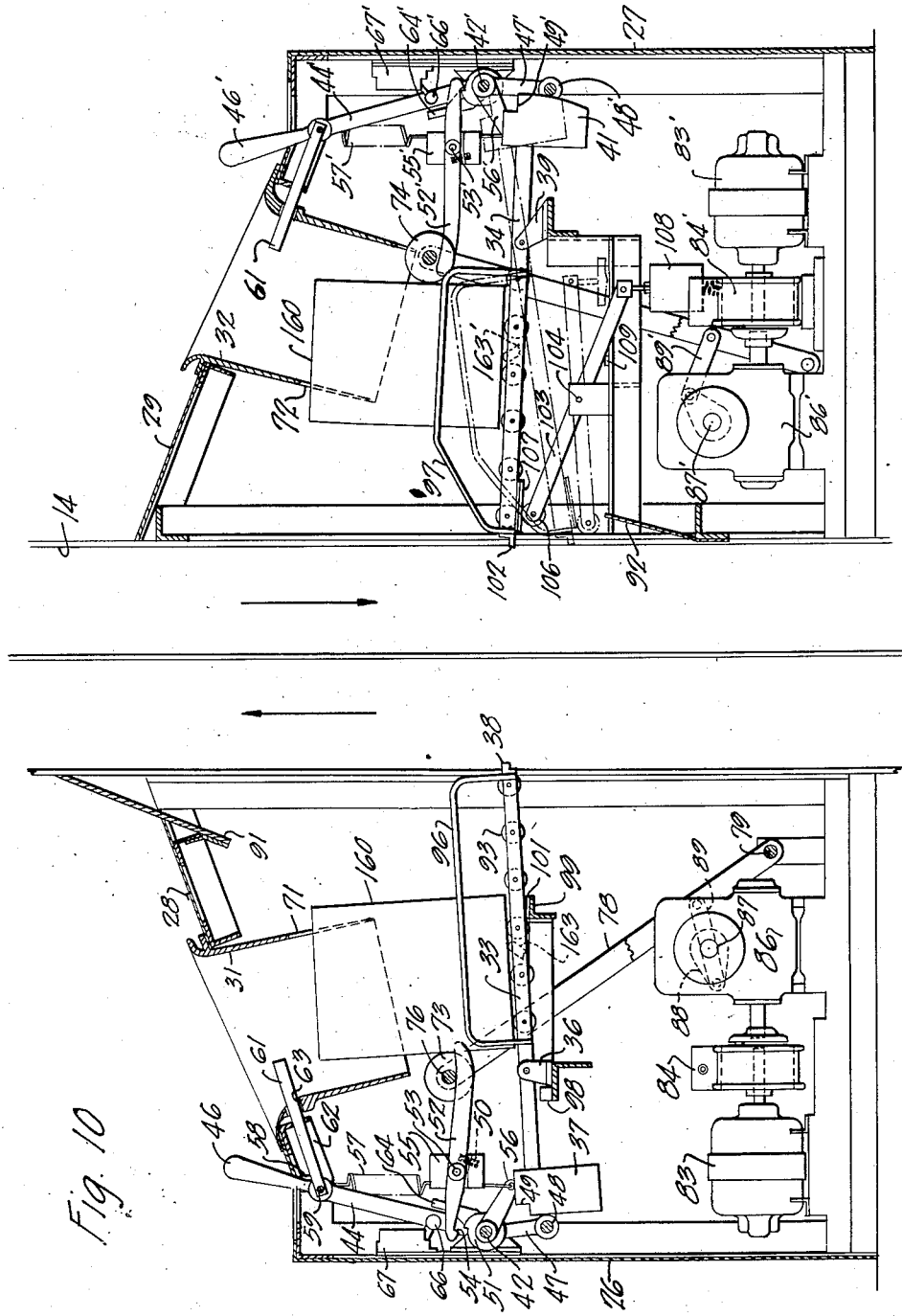

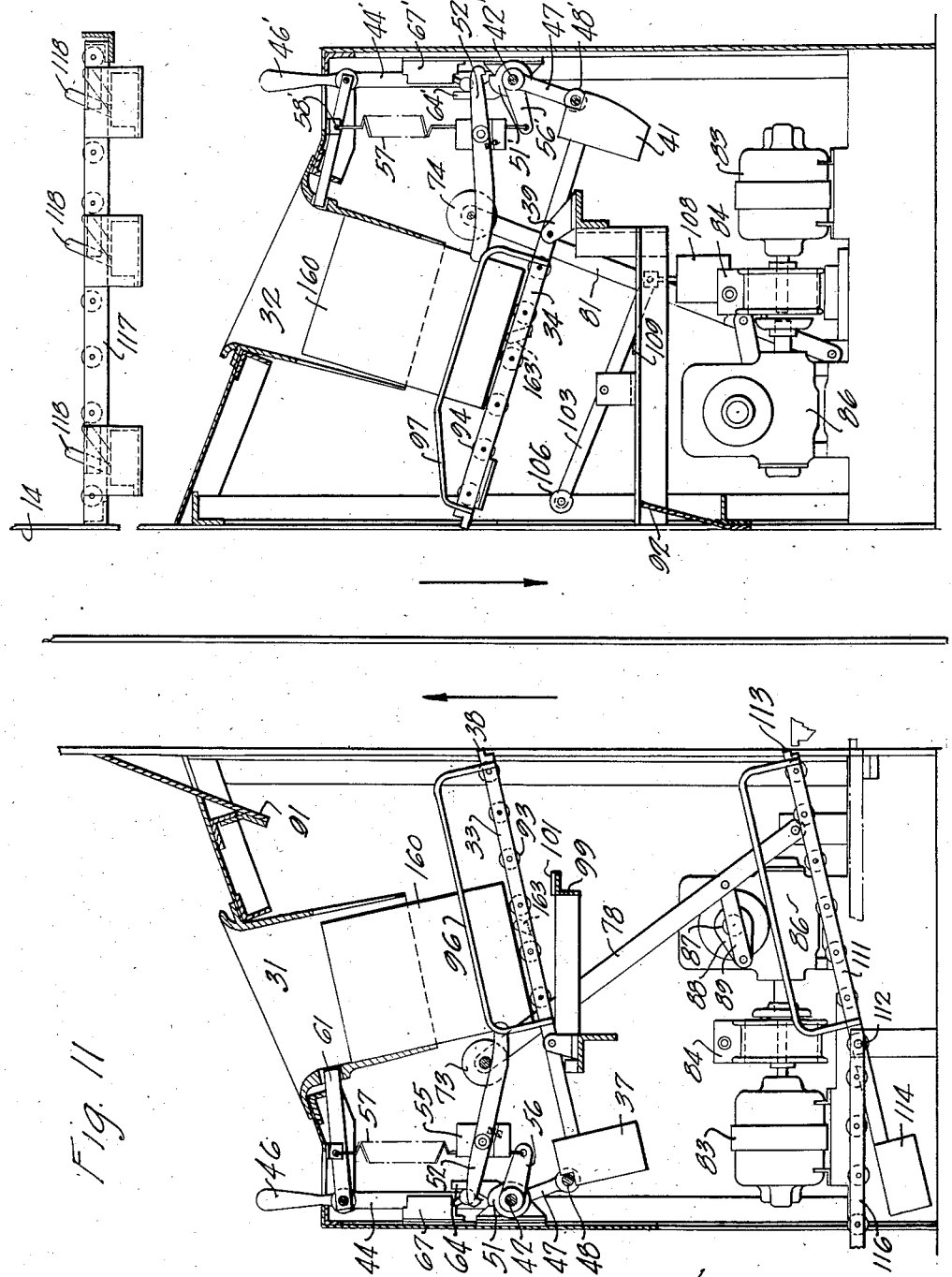

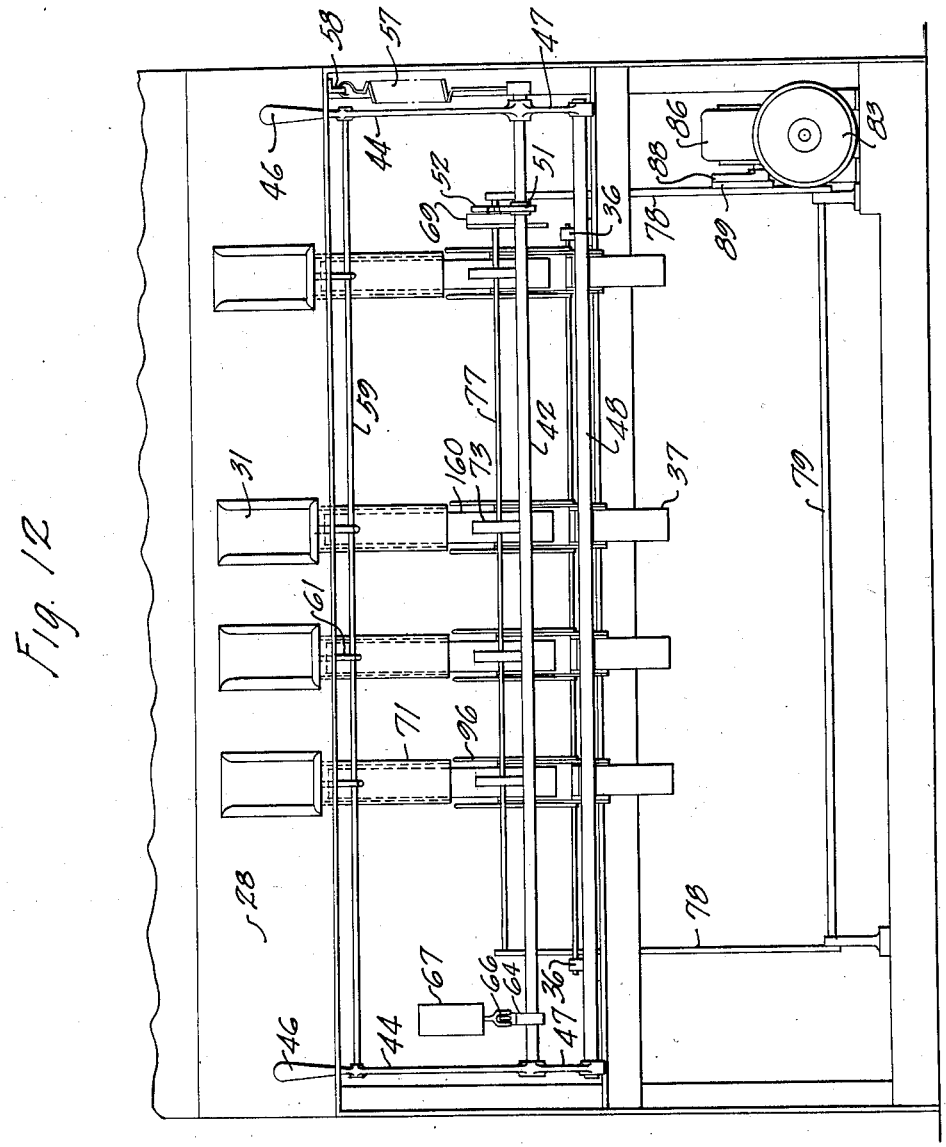

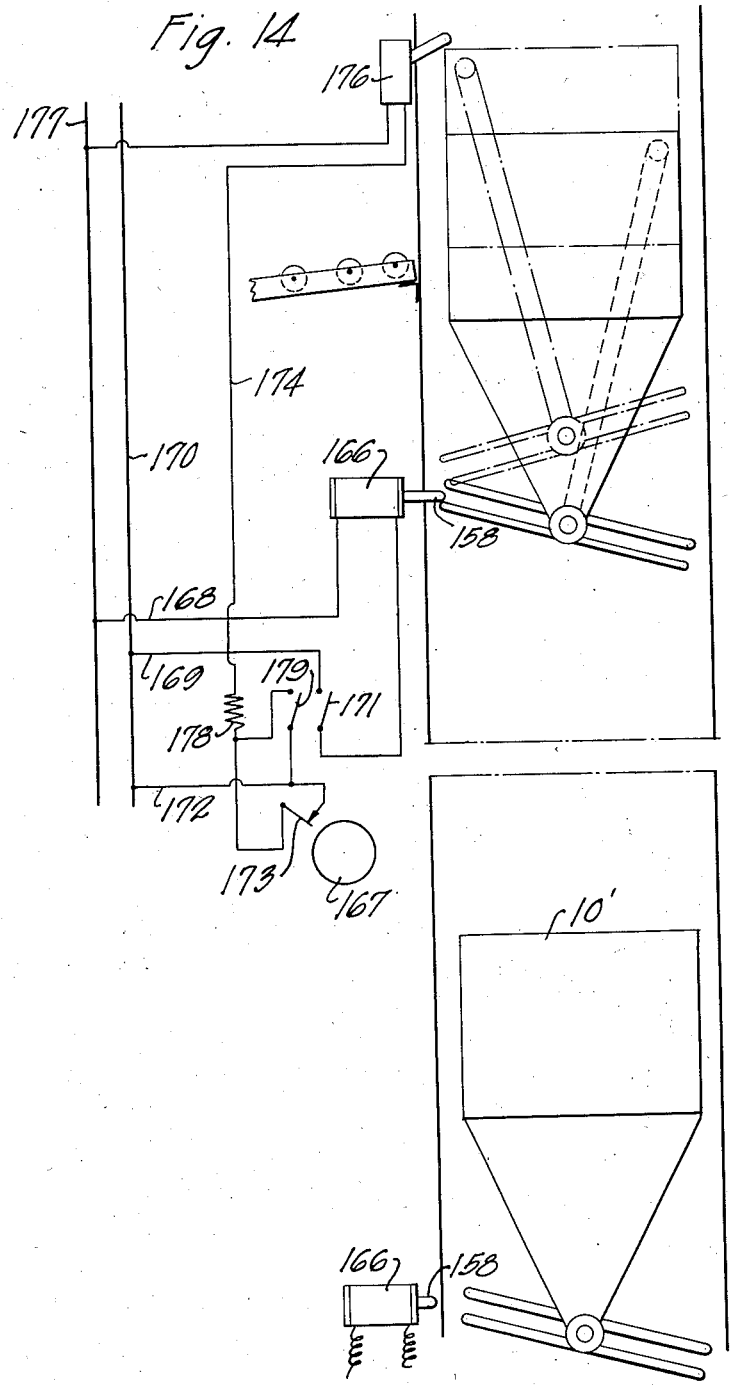

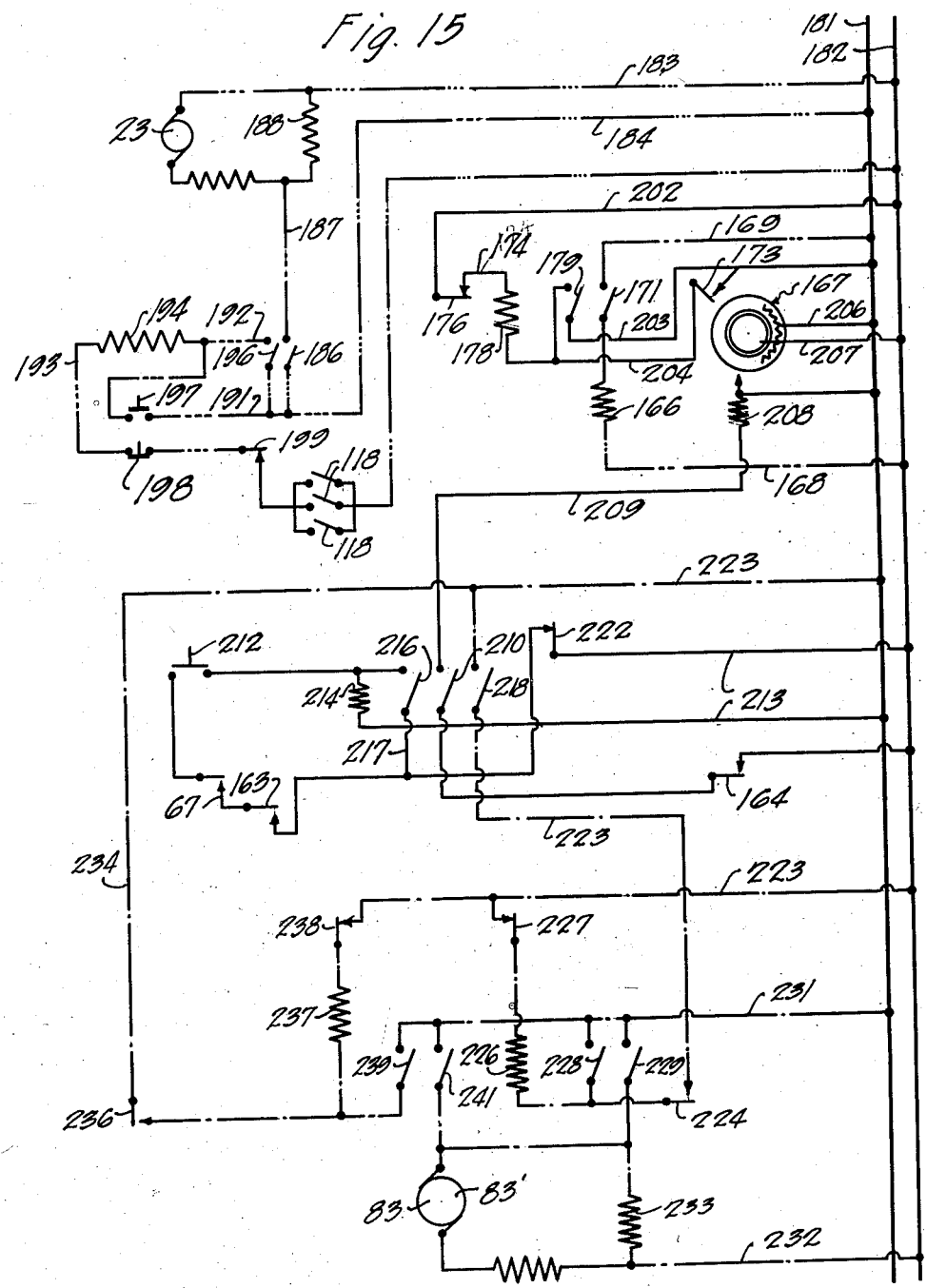

Patented May 21, 1935

2,002,009

UNITED STATES PATENT OFFICE 2,002,009

CONVEYER SYSTEM

Simeon T. Hart and Willard A. Marcy, Syracuse, N. Y., assignors to The Lamson Company, Syracuse, N. Y., a corporation of Massachusetts Application December 30, 1930, Serial No. 505,576

22 Claims. (Cl. 198—20)

This invention relates to a conveyer system by which articles or materials are transported vertically, as between different floors of a building, such a system being of the general type wherein cars move upwardly and/or downwardly past several article transfer stations at which articles may be despatched to or ejected from passing cars. In some aspects the invention relates to article transfer stations adapted to receive articles ejected from continuously moving cars and also equipped for receiving articles to be despatched and for despatching such articles in properly timed relation to lodge the same in certain compartments of passing cars. Other aspects relate more particularly to features of article receiving stations and of article despatching apparatus. The invention also pertains to cars and to means for ejecting articles from cars in properly timed relation at selected or predetermined stations. Still further aspects of the invention relate to the mode of operating and of controlling a system of this kind, and also to the improved construction and arrangement of parts of the apparatus.

Objects of the invention are to improve the art of conveying articles vertically by providing improved means for effecting the transfer of articles to and from article conveying cars; to provide improved cars for these purposes as well as improved means for ejecting articles from cars suitable for systems of this general class; to increase the utility of systems of this kind by providing for selectively ejecting articles from a traveling car at any one of a plurality of receiving stations; to provide improved means for controlling and operating a system of the class described; and also to provide apparatus for these purposes having an improved construction and arrangement of parts.

In the drawings wherein several embodiments of this invention are disclosed;

Fig. 1 is a sectional elevation of a vertical conveyer system embodying one form of this invention;

Fig. 2 is a diagrammatic view illustrating one manner of operating the system shown in Fig. 1;

Fig. 5 is a perspective view with parts omitted and other parts broken away further to illustrate the apparatus shown in Figs. 3 and 4;

Fig. 6 is a side elevation of an elevator car which may be used with the system shown in either Fig. 1 or Fig. 3;

Figs. 7 and 8 are respectively top plan and end elevational views of the car shown in Fig. 6;

Fig. 9 is an enlarged section showing the despatching stations for both the upgoing and downgoing cars of a system of the types shown in either Fig. 1 or Fig. 3;

Fig. 10 is a view similar to Fig. 9 but showing the movable parts in different relative positions;

Fig. 11 is a section through the despatching and receiving stations for the upgoing and downgoing sides of a conveyer system of the type shown in Fig. 1;

Fig. 12 is a rear elevation with parts broken away of a despatch station for the upgoing side of a conveyer system of the type shown in either Figs. 1 or 3;

Fig. 14 is a diagrammatic view showing the wiring diagram for a timer circuit and illustrating the manner in which this circuit may be employed for controlling the transfer articles from a car to a remote station; and Fig. 15 is a wiring diagram for a conveyer system of the type illustrated in the preceding figures.

Figure 3:
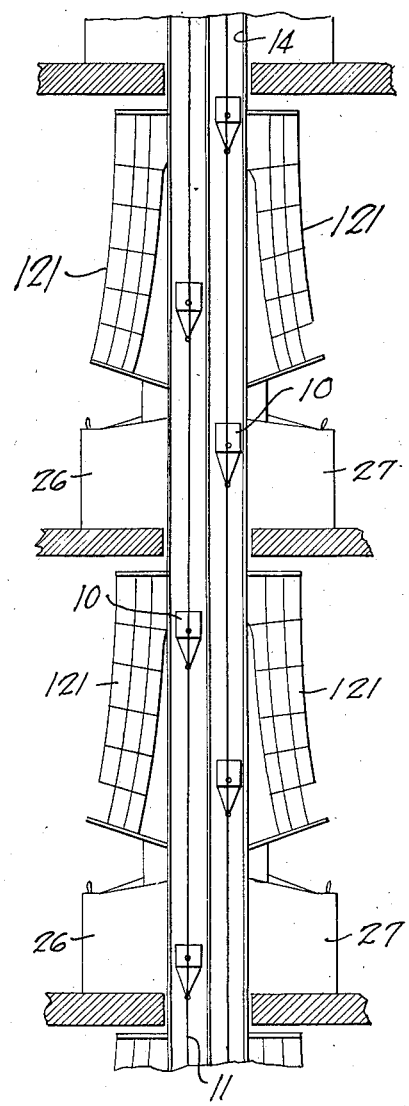
Fig. 3 is a sectional elevation of a modified form of conveyer system.

In the embodiment of the invention illustrated in Fig. 1 a number of article carrying cars 10 are mounted in suitably spaced relation upon endless chains 11, the latter being trained over upper and lower sprockets 12 and 13 located respectively at the upper and lower ends of the elevator well 14. This well extends past various floors, as for example those designated by the numerals 16, 17 and 18, and on each floor adjacent the well on the upgoing and downgoing side are provided article transfer stations. The stations 20 on the floors 16 and 17 for both the upgoing and downgoing sides of the conveyer are of the type illustrated in Fig. 11. On the top floor 18 there is provided on the upgoing side a receiving station 21 only and on the downgoing side a despatching station 22 only, the latter preferably being of the type illustrated on the right in Figs. 9 and 10. A driving motor 23 is mounted at the top of the well and connected through reduction gearing 24 for driving the upper sprocket 12 and thereby operating the endless chains 11, which carry the cars 10.

The apparatus for despatching articles to upgoing or downgoing cars may, as illustrated in Figs. 9 and 10, comprise cabinets 26 and 27, the top walls 28 and 29 of these cabinets being fitted with a plurality of article receiving inlets here shown in the form of chutes 31 and 32 inclined downwardly towards the well 14. These chutes are preferably arranged in a transverse row across the top of each cabinet, being spaced for delivering articles to certain compartments of each of the cars 10. Article receiving platforms or racks 33 and 34 are arranged below the chutes, one platform being disposed below each chute in position to receive an article therefrom. The platforms 33 are each mounted to pivot on a bracket 36 and provided with a counterbalance 37 which is affixed to a rearwardly extending portion of the platform and arranged normally to balance an empty or unloaded platform in an upwardly inclined position, as shown in Fig. 9, the forward or outer edge 38 of the platform being out of the path of travel of passing cars through the well. Similarly the platforms 34 in the cabinet 27 are each mounted to pivot on a bracket 39 and provided with a counterbalance 41 which is likewise arranged to balance this platform when empty or unloaded in an upwardly inclined position out of the path of travel of downgoing cars.

A rotary shaft or rock shaft 42 is mounted in a bracket 43 affixed to the rear wall of the cabinet 26. An operating lever 44, fixed fast on this shaft is provided with an operating handle 46 projecting through a slot in the top wall of the cabinet. Depending arms 47 are spaced longitudinally along the shaft 42 and affixed thereto at points substantially in alignment with the platforms 33. Each of these arms carries at its lower end a lug or abutment member 48 which is adapted to register with and to be received within a cutaway portion 49 in the counterbalance 37 when the parts are arranged in the manner shown in Fig. 9. Also spaced longitudinally along the shaft 42 at points behind each of the platforms 33 are cam members 51, these cams being fast on this shaft. A latch member 52 is mounted to pivot intermediate its ends as at 53 and has a beak or lip 54 which is engageable under some conditions with the cam 51. The latch member is normally urged in a counterclockwise direction, as viewed in Fig. 9, by a coil spring 50 which seats in recesses provided in the member 52 and in its supporting bracket 55. An arm 56 affixed to the shaft 42 is connected at its outer end to a tension spring 57, the upper end of this spring being attached to any fixed support, as to a bracket 58 carried by the top wall of the cabinet.

Adjacent the upper end of the lever 44, a rod 59 is affixed thereto and arranged to extend substantially parallel to the shaft 42. In case two levers 44 are provided, as illustrated in Fig. 5, this rod is affixed to both of these levers. A plurality of bars 61, one for each of the inlet chutes 31, are pivotally mounted on the rod 59 at points behind these chutes. At their forward ends the bars are loosely supported in guide brackets 62 and are receivable in openings 63 formed in the chutes. The shaft 42 also has affixed thereon an arm 64 which is adapted on movement to actuate the arm 66 of a circuit maker 67 of any well-known type. As many of the parts just described are also arranged in the cabinet 27 in substantially the same manner, such parts will not be described in detail but are indicated by corresponding reference characters bearing a prime (') mark.

The lower ends of the chutes 31 and 32 are spaced above the article receiving or transfer platforms 33 and 34 at a height less than that of the articles to be received and transferred to passing cars. The lower portions of these chutes are therefore effective for supporting articles or for preventing such articles from sliding down the inclined platforms. In order to permit such articles to be transferred from these platforms the forward wall of each of the chutes is cut away, as indicated at 71 and 72, so that the articles may be pushed forwardly across the platforms through the front side of the chutes. For moving the articles in this manner there are provided article engaging means in the form of rollers 73, 74 mounted upon shafts 76, 77 extending transversely behind the positions occupied by articles disposed on the platforms. The shaft 76 is carried by a pair of arms 78 mounted to pivot at 79 in the lower portion of the cabinet 26. Likewise the shaft 77 is carried by a pair of arms 81 mounted to pivot at 82 in the base of the cabinet 27.

For imparting an oscillatory motion to the arms 78 and 81 there is provided in each cabinet a motor reduction set. The set shown in the cabinet 26 comprises a driving motor 83 equipped with a solenoid brake 84 and connected to a speed reducing unit 86. Power is delivered from the rotary driven member 87 of this reducing set through a crank arm 88 to a link 89 connected to the arms 78, these parts being so arranged that on each complete revolution of the driven member 87 the arms are so moved as to cause the article engaging rollers 73 to traverse the platform 33 substantially to the forward edge thereof and to return to the position shown in Fig. 9. When in this position the shaft 76 bears on the forward end of the latch member 52 to depress the latter, as shown in Fig. 9. Likewise the motor reduction set furnished with the cabinet 27 comprises a driving motor 83', a solenoid brake 84', and a speed reducing unit 86', the latter having its driven member 87' connected through a crank arm 88' and a link 89' to the arms 81.

The forward side of each of the cabinets 26, 27 is substantially open, as shown in Fig. 9, and a deflector guide 91 is inclined upwardly toward the well at the upper side of the cabinet 26 for directing or guiding articles onto a passing car should such articles project slightly into the cabinet. Similarly in the cabinet 27 on the downgoing side there is provided a deflector guide 92. To facilitate movement of articles across the platforms 33 and 34 the latter preferably are in the form of spaced rails which support a number of rollers 93, 94. Guide rails 96 and 97 are also arranged to extend along the sides of these platforms for guiding articles as they are transferred to passing cars. A block 98 of yieldable or elastic material, such as rubber, is mounted upon a fixed support to engage the platform 33 to eliminate noise and vibration and to assist in holding the platform snugly in the position shown in Fig. 9. This platform is also movable downwardly or in a clockwise direction about its pivot against a fixed support 99 which is also provided with a yieldable pad 101 of rubber or the like. When in the latter position, as shown in Fig. 10, the article receiving platform 33 may be still slightly inclined but the forward edge 38 thereof projects a sufficient distance into the well 14 to be in the path of travel of the upgoing cars.

The platform 34 in the cabinet 27 is also movable downwardly or in a counterclockwise direction about its pivot from its upper position, wherein the outer edge 102 thereof is spaced inwardly from the well to an intermediate position, such as that shown in Fig. 10, wherein the platform may still be slightly inclined but with the outer edge 102 thereof projecting into the well 14 for engagement with downwardly traveling cars. For assisting in supporting the platform 34 in this position, a lever 103 is mounted to pivot at 104 on a fixed support and carries at its upper or forward end a roller 106 which is engageable with a pad 107 affixed to the lower side of the platform 34. At its lower end the lever 103 carries a counterbalance weight 108. A bar 109 is mounted upon the frame in the path of movement of the lever 103 at a point to limit upward movement of the roller 106 when the latter attains substantially the position shown in Figs. 9 and 10. The weight 108 therefore does not become effective for counterbalancing any tendency of the platform 34 to descend until the latter arrives substantially at its intermediate or article transferring position, as shown in Fig. 10.

As previously pointed out herein, article despatching apparatus of the type illustrated in Figs. 9 and 10 is intended to be used in the systems of the type shown in Fig. 1 as well as that shown in Fig. 3. When used in a system such as that shown in Fig. 1, each of the cabinets 26 for the floors 16 and 17 is also provided with a gravity roller section 111 mounted to pivot at 112 and adapted to swing from an upper inclined position, as shown in Fig. 11, downwardly or in a clockwise direction about its pivot to an approximately horizontal position wherein the outer edge 113 projects into the well a sufficient distance to be engageable with upwardly passing cars so as to be movable in unison therewith. The gravity roller section is also equipped with a counterweight 114 and is arranged to deliver articles to a stationary roller section 116 from which they may be removed in any approved manner.

Apparatus for receiving articles from downgoing cars is preferably arranged above each of the cabinets 27 on the floors 16 and 17 and comprises a stationary gravity roller section 117 which may extend substantially horizontally from the well 14. Preferably the section 117 is equipped with a plurality, as for example with three circuit breakers 118. These circuit breakers are spaced so that when this platform is filled, for example with three boxes or articles, each circuit breaker will be actuated and when all of the circuit breakers are actuated the driving motor 23 which operates the cars will be stopped. On the upper floor 18 the article transfer station 21 for the upgoing side comprises only the article receiving apparatus 117 just described. On this same floor on the downgoing side obviously there is no article receiving station, but the article despatching station 22 is similar in all respects to the apparatus illustrated on the right in Figs. 9 and 10.

Figure 4:
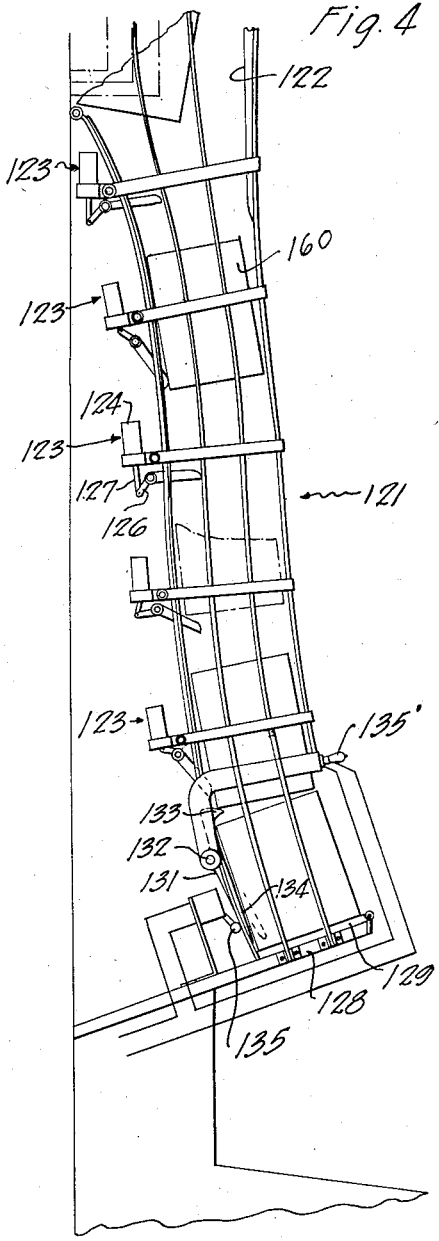
Fig. 4 is an enlarged elevation of one of the receiving chutes shown in Fig. 3.

In the system illustrated in Fig. 3, the article despatching apparatus is enclosed in cabinets 26 and 27 and is similar in all respects to that described with reference to Figs. 9 and 10. In this system, however, the article receiving apparatus is in each instance located above the article despatching apparatus. This article receiving apparatus is in the form of a chute 121 preferably of sufficient length to contain several boxes or articles such as those being transported. As shown in Fig. 4 at a point opposite that where the well 14 opens into the chute 121, the latter is provided with a soft cushion 122 which guides articles or boxes into the lower or depending portion of the chute. The chute shown is adapted to contain six boxes or articles of the type which might be conveyed in a system of this kind. As shown more clearly in Fig. 5, these chutes are also divided vertically into compartments corresponding to the compartments in the car which conveys the articles. Preferably each compartment of the chute has vertically spaced sight openings 120.

For retarding or breaking the fall of descending articles, a number of retarding devices 123 are provided at points spaced along the chute. Each of these devices comprises a dash-pot 124 and a rocker 126 which is adapted normally to project into the chute in the path of descending articles and is connected at its outer end to the piston rod 127 of the dash-pot, these parts being so arranged that each rocker 126 is movable in a clockwise direction, as shown in Fig. 4, under the influence of a downwardly moving article so as to permit such article to pass but in so doing the dash-pot offers sufficient resistance to this movement to retard or break the fall of the article. A partition or wall 128 extends transversely across the lower end of the chute and is provided with a cushion 129 on which the articles rest, the outer or front wall of the chute adjacent the lower end thereof being cut away, as illustrated in Figs. 3 and 5, to permit removal of articles from the cushion 129.

At its lower end each compartment of the chute is equipped with a spacer arm 131 mounted to pivot at 132 and having a beak 133 at its upper end and an inwardly curved tail 134 at its lower end. These parts are so constructed and arranged that when an article is disposed on the cushion 129 this article will also engage the inwardly curved tail 34 and thereby force the beak into the chute at a point above the article resting on the cushion 129 so as to form an abutment or support for the next article descending through the chute and thereby to space such article and hold the latter out of engagement with an article in position to be removed. This greatly facilitates the removal of articles, for by means of this construction each article reposing at the lower end of the chute is freely removable therefrom regardless of the number of articles in the upper portion of the chute. Also an article reposing in the lower end of the chute is adapted to hold the tail piece 134 in position to actuate a circuit maker 135 which operates a signal device 135' by which an operator may be informed of the arrival of an article.

The cars 10 for the systems illustrated in Figs. 1 and 3, may be of the type shown in Figs. 6, 7 and 8. The body of these cars is provided with substantially open sides to permit articles to be loaded or unloaded from either side of the cars. In the present instance the body or frame comprises longitudinal side members 136 which are connected to end frames 137, the latter being equipped with upwardly directed centrally disposed brackets 138 on which are fitted trunnions 139 by which the frames are mounted upon the chains 11 (Fig. 1). Substantially triangular frames 141 depend from each end frame and are bored to receive a shaft 142 which is pinned to the frames and extends longitudinally substantially on the vertical center line of the car. Spaced longitudinally along the side frames 136 are substantially vertical transverse partition members 143 arranged to provide a plurality of article carrying compartments having open ends and preferably also being open on the upper side.

Within each of these compartments, and spaced from each of the side walls thereof, floor strips 144 extend transversely between the side frames for supporting the articles.

Below each compartment a block 146 is mounted to oscillate on the shaft 142. Each block is provided with upwardly directed ears 147 to which are fixed a pair of substantially parallel bars or arms 148, these arms being adapted to extend through the slots or openings, formed by the floor plate and the partitions 143, upwardly along the side walls of the superposed compartment to a point somewhat below the upper edge thereof. At their upper ends the arms 148 are connected by an article engaging means which may be in the form of a bar 149 and the latter may also be rotatably mounted on the arms 148 if so desired. Extending transversely across the upper side walls of each compartment are buffer strips 151 of yieldable or elastic material such as rubber. These strips are preferably spaced relatively close to the course of travel of the member 149 so that as the latter passes through a compartment from one end to the other thereof the buffer strips 151 will assist in steadying the article as it is moved out of the compartment as well as in steadying and guiding the article as it is transferred into the compartment by one of the despatching stations previously described herein.

Each block 146 is also equipped with laterally extending substantially parallel bars 152 and 153, the latter being mounted above the shaft 142 and the former below this shaft, although of course it will be understood that this arrangement may be reversed. Preferably these bars are of substantially equal length and are so positioned as to be substantially perpendicular to the arms 148. When a compartment of the car is loaded with an article, such as the box 160 as shown in Fig. 8, the parts will be so arranged that the lower bar 152 will project laterally a greater distance than the upper bar 153, on the left side of the car, as viewed in this figure, while on the right side the upper bar 153 will project laterally to the right a greater distance than the lower bar 152. The side frames of the car are equipped with angles 154 which project laterally thereof for engagement with various abutments, such as circuit breakers and the like disposed in the well for engagement with passing cars. The end frames of the car may also be fitted with anti-friction rollers 156 and with guide blocks 157, the latter being adapted to ride in guideways or guide-channels formed in the ends of the well.

Figure 13:
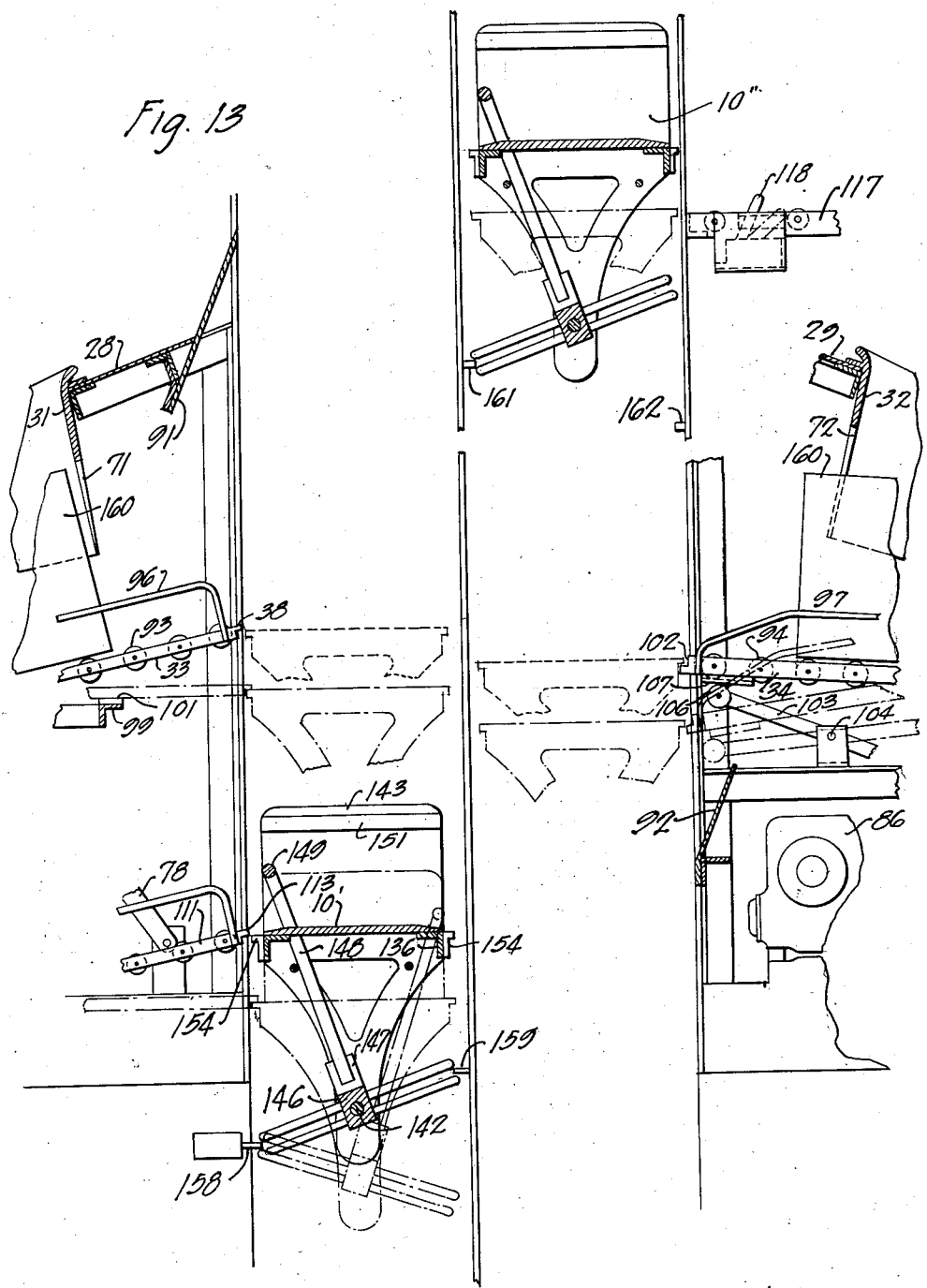
Fig. 13 is a section showing the despatching and receiving stations on the upgoing and downgoing sides of the system and showing cars approaching the stations and illustrating the mode of operation of this apparatus.

With cars of the type just described it will be observed that the article ejecting or removing means comprise the members 149 and their associated parts by which they are connected to the rotary blocks 146 and the bars 152 and 153 by which these blocks may be oscillated about the shaft 142, all carried by the car, and that the ejecting apparatus for each compartment of the car is independently operable. With this construction it becomes possible to remove automatically the article or articles from any one or all of the compartments at any predetermined receiving station. The manner in which the ejecting apparatus functions to accomplish this result is illustrated in Fig. 13, wherein the upgoing car 10' is illustrated as having just passed an abutment means 158. As the car approached this abutment means 158 the article ejecting means occupied the position shown in the dotted lines in this figure and also illustrated in Fig. 8. With the ejecting means in this position, the outer end of the upper bar 153 just cleared an abutment 158 but the outer end of the lower bar 152 engaged this abutment and therefore the lower bar became effective as the car moved upwardly to rock the block 146 about the shaft 142 and thereby to swing the arms 148 in a counterclockwise direction or to the left as viewed in Fig. 13. This movement of the article ejecting means was effective therefore to remove an article from the compartment illustrated. At approximately the same time that the bar 152 engaged the abutment 158, the side angle 154 engaged the projecting outer edge 113 of the hinged gravity roller section 111 of the station shown in Fig. 11 so as to cause this gravity roller section to move upwardly in unison with the car and thus to remain in register therewith during transfer of the article to this receiving station.

In order to prepare the car to receive an article from the superposed article despatching apparatus such as that illustrated in Fig. 11 should it be desired to load an article at this point, an abutment 159 is positioned on the opposite side of the car on a central vertical partition extending through the well. This abutment is so located as to permit the upper bar 153 to pass but to engage the projecting end of the lower bar 152, and due to such engagement as the car continues its upward course to cause the article ejecting apparatus to swing in a clockwise direction so as to return to the position shown in Fig. 8, in which condition the car is about ready to be loaded. As the car 10 continues its upward course to the dot and dash line position, it engages the projecting edge 38 of the platform 33 and moves the latter upwardly in unison therewith during transfer of an article from the platform 33 to the car. It will also be observed that as an article is transferred from this platform to the car the transverse member 149 of the ejecting apparatus serves as an abutment or stop to prevent over-travel of such article as it is forced or thrust into a compartment of the car.

As each car, such as the car 10', approaches the upper limit of its travel, at the receiving station 21 illustrated in Fig. 1, the ejecting apparatus is operated by an abutment such as the abutment 158 but no abutment corresponding to the abutment 159 is provided at this point, for it will be seen that as the car descends the ejecting apparatus must occupy the position shown in the full lines on the car 10'' illustrated on the downgoing side of the well in Fig. 13. As this car approaches an article receiving platform, such as the roller section 117 (Figs. 11 and 13), the ejecting apparatus is operated in a manner similar to that just described, first by engagement with an abutment 161 which transfers the article to the platform 117, and then by engagement with an abutment 162 which returns the ejecting apparatus to the position shown in full lines on the car 10'', in which condition this car is ready to be loaded by the article despatching apparatus which it is approaching.

This article despatching apparatus is of the type illustrated at the right in Figs. 9, 10 and 11. As the car descends, the side angle 154 thereof engages the outer projecting edge 102 of the platform 34 and carries this platform downwardly substantially to the dot and dash line position illustrated in Fig. 13, thereby moving the platform against the influence of the counterbalance weight 108 and maintaining the platform in register with the car during transfer of an article onto the car. It will also be observed that when the platform is in the dot and dash line position, the outer edge 102 thereof has swung inwardly sufficiently to permit the car to pass by after which the counterbalance weight 108 becomes effective through the lever 103 to return the platform 34 at least to its intermediate or article transferring position, as shown in Fig. 10, from which it is returned by the counterbalance 41 to the normal position shown in Fig. 9. During downward movement of this platform as just described, it will be seen that the counterbalance weight 108 serves to maintain the outer edge 102 of the platform in firm engagement with the side angle of the car and therefore assures proper registry of these parts during the period in which articles are transferred.

In the operation of article despatching apparatus for the upgoing side, such as the apparatus enclosed in the cabinet 26 shown on the left in Figs. 9 and 10, articles such as boxes 160 are deposited in various inlet chutes 31 provided at this particular station, the parts being arranged at this time in the position shown in Fig. 9. As an article passes through each chute 31 onto the platform 33, it actuates a circuit maker 163 mounted upon the platform. At this time the abutment 48 on the arm 47 is disposed in the recessed or cut-away portion 49 of the counterbalance 37 and is yieldably held in this position by the tension spring 57 which tends to urge the shaft 42 in a counterclockwise direction, thereby holding the operating lever 44 in a substantially vertical position. The platform 33 therefore is locked in its upper or inclined position substantially as shown in Fig. 9 wherein the outer edge 38 of this platform is spaced inwardly from the well 14. To place the platform in condition for transferring an article thereon to a passing car, the lever 44 is moved in a clockwise direction, as viewed in Fig. 9, substantially to the position shown in Fig. 10. This movement of the lever 44 is effective to remove the abutment 48 from the recess 49 and thus to permit the platform 33 to descend under the influence of the weight of the article diposed thereon to its article transferring position in which the platform rests upon the pad 101 carried by the fixed abutment 99. This same movement of the lever 44 also carried the rod 59 forwardly or to the right and thus moved the bar 61 associated with each chute forwardly through the opening 63 into the chute so as to obstruct the pasage of other or additional articles into the chute while an article is disposed therein ready for despatch to an approaching car. At the same time the circuit maker 66 is actuated by the arm 64.

As a car approaches this station an angle 154 thereon engages a circuit maker 164 mounted in the well, which circuit maker becomes effective in a manner to be described more fully hereinbelow to actuate the motor 83 at the proper time to cause the arms 78 and the article engaging rollers 73 to move transversely across the platform 33 to force or push an article disposed thereon onto a passing car while the latter is in register with the platform. As the arms 73 move forwardly to initiate this article transferring movement, the shaft 76 releases the latch member 52 so that the spring 50 becomes effective to move this member in a counterclockwise direction into interlocking engagement with the cam 51, this cam having been moved to a position to permit this, as shown in Fig. 10. The latch member, therefore, cooperates with the cam 51 to lock the shaft 42, the lever 44, and the bars 61 in the position shown in Fig. 10 so as to hold the bars 61 in position to obstruct the passage of articles through the inlet chutes 31 until the article engaging means 73 and the shaft 76 return to the position shown in Fig. 9. In returning the shaft 76 again rides over the forward end of the latch member 52 and depresses the latter so that the beak 54 of this member is disengaged from the cam 51 and the spring 57 then becomes effective to rotate the shaft 42 in a counterclockwise direction and to return the parts to the position shown in Fig. 9. As soon as an article is transferred from the platform 33, the counterbalance 37 becomes effective to cause this platform to return to its upper or inclined position, substantially as shown in Fig. 9, so that the lug 48 may again be received in the cutaway or recessed portion 49 of the counterweight. It will be understood that the operation of these parts as described with respect to the removal of an article from the platform, takes place substantially simultaneously. In case some of the chutes 31 at a station are not loaded with articles, the platforms 33 associated with these chutes remain in their upper or inclined positions, as shown in Fig. 9, and the article engaging means 73 passes back and forth freely above these platforms.

The despatching apparatus for the downgoing side, as shown in the cabinet 27 on the right in Fig. 9, operates substantially in the same manner as that previously described with the exception that the platform 34 is moved under the weight of an article disposed thereon from its upper inclined position to an intermediate or article transferring position, substantially as shown in Fig. 10, and then upon engagement with a passing car is depressed further to the dot and dash line position (Fig. 13).

The manner of operating a system of the types described may be further illustrated by means of the diagram shown in Fig. 2. In this view the characters O, P, Q, R, S, T, U, V, W, X, and Y indicate inlet chutes on the upgoing side. Likewise the characters O', P', Q', R', S', T', U', V', W', X', and Y', at the top of the diagram indicate inlet chutes serving the downgoing side. The stations served from inlet O on the upgoing side are 3, 4, 5 and 6. The inlet P on this side serves merely station A and articles are relayed from this station to stations 4, 5 and 6. The inlet Q serves only station 2 and articles are relayed from this station to station 4. The inlet R serves station 1 from which articles are relayed to station 6. No other inlets are provided on the B level on the upgoing side.

On the A level the inlet S serves station 1 from which articles are relayed to station 2 and then articles are again relayed from this station to station 6. Likewise the inlet T on the A level serves station 3 from which articles are relayed to station 6. The inlet U on the A level serves station 2 from which articles are relayed to station 3, being again relayed from this station to station 5 and thence to station 6. There are no other inlet chutes on the A level on the upgoing side.

On the first floor level the inlet V serves station 3 from which articles are relayed to station 4 and again to station 5. The inlet W on the first floor level serves station 4 from which articles are relayed to station 6. The inlet X on the first floor level serves station 5 only. No other inlets are provided on the first floor level. On the second floor level the inlet Y serves only station 5. This completes the arrangement of inlets for despatching articles on the upgoing side of the apparatus.

On following out the arrangement shown on the downgoing side, it will be seen that the inlet O' on the sixth floor level serves stations 2, 1, A and B. The inlet P' serves station 5 from which articles are relayed to stations 2, 1, A, and B. The inlet Q' serves station 4 from which articles are relayed to the B level. The inlet R' serves station 3 from which articles are relayed directly to the B level. The inlet S' and T' are on the fifth floor level. The inlet S' serves station 4 from which articles are relayed directly to station 1 and again from the latter station to station A and then from station A to station B. The inlet T' serves station 3 directly and articles may be relayed from this station to station 1 and then to the B level. Stations U', V', and W' are on the fourth floor level. Station U' serves station 2 from which articles are relayed to station 1. Station V' serves station 3 from which articles are relayed to station 2 and thence to the B level. Inlet W' serves the A level only. The inlet X' is on the third floor level and serves the A level only. The inlet Y' is on the second floor level and serves the A level only.

It will be observed that with an arrangement such as that illustrated in Fig. 2 it is necessary for a single inlet, as the inlet O on the B level on the upgoing side to serve a plurality of stations. In order to accomplish this with a car of the type illustrated in Figs. 6, 7 and 8, the abutment means 158 which actuate the article ejecting means are arranged to be movable in response to a remote control apparatus. Referring to the diagrammatic illustration shown in Fig. 14, it will be seen that an upwardly traveling car 10' has passed an abutment means 158 on the third floor level and the ejecting apparatus is about to be actuated by an abutment 158 on the fourth floor level. These abutments are mounted to be movable by solenoids 166. It will be understood that as the solenoids 166 are energized the abutment means 158 is moved thereby into the path of an approaching car. In order to energize each solenoid in properly timed relation there is provided a timing device 167 of the type disclosed in the patent to Spooner, No. 1,528,227, dated March 3, 1925.

The circuit for energizing the solenoid comprises the leads 168 and 169 from the main line, the latter lead being normally open at a switch 171. The timer circuit includes the lead 172 from the main 170, the normally open switch 173, which is adapted to be closed by the timer 167 at the proper instant, and the line 174 which leads through the circuit breaker 176 back to the main 177. It will be seen that as the timing switch 173 is closed a circuit is completed through a relay 178 which closes the switch 179 and also the switch 171, the latter switch completing the circuit through the solenoid 166 and energizing the same while the switch 179 cuts the timing device 167 out of the circuit. Both of these switches are held closed by the relay 178 until such time as the car 10' has delivered its load to the station and has passed far enough beyond this station to trip the circuit breaker 176 which breaks the circuit through the solenoid and also through the holding relay 178 thereby restoring the parts to their first mentioned position.

In Fig. 15 is illustrated a wiring diagram for a station of a system embodying this invention.

The main driving motor 23 is connected across the mains 181, 182 by the lead 183 and the lead 184, the latter lead being connectible to the motor through the main starter switch 186 and lead 187. A solenoid 188 is connected across the motor for operating a solenoid brake on the main drive in the usual manner. From the lead 184 a circuit leads through the parallel circuits 191, 192 and the line 193 to the main 182. A holding relay 194 is interposed in the line 193 for controlling the starter switch 186 and a switch 196 interposed in the circuit 192. A starting button or switch 197 is interposed in the circuit 191 so that on depressing this button the circuit 191 is completed and the holding relay 194 becomes effective to close the switches 196 and 186, thereby completing the motor circuit and also completing the circuit through the lead 193 back to the main 182. A push button 198 is connected in the line 193 at each floor station so that by operating this button the main drive may be stopped. A safety circuit breaker 199 is also interposed in the line 193 at each despatch station. These circuit breakers are located at the respective despatch stations to be engageable and operable with loads which are improperly placed on the cars so as to overhang the same. The circuit breakers 118 shown in Fig. 11 are connected in parallel in the line 193 as shown, hence when all three of the circuit breakers 118 are actuated the circuit is broken through this line.

The solenoid 166 for actuating the movable abutment means at the various stations are carried to the main line by leads 168, 169 forming a circuit controllable by a switch 171. The timing circuit for controlling these solenoids is indicated as comprising a lead 202 which is connected through the parallel circuits 203 and 204 to the main 181. The circuit breakers 176 are interposed in the lead 202 as are also the holding relays 178. The switches 179 are interposed in the circuit 203 while the timer actuated switches 173 are interposed in the circuits 204. Power for operating the timer is supplied from the mains 181 and 182 through the leads 206 and 207. The charging solenoid for the timing device is indicated at 208 as being interposed in a line 209 which leads through a switch 210 and the circuit maker 164 to the main 182.

At each floor station a push button or normally open switch 212 is interposed in a circuit 213 connected across the mains 181 and 182. A relay 214 is also interposed in this circuit for actuating a switch 216 in a parallel circuit 217 as well as for actuating the switch 219 and a switch 218 disposed in a circuit 223. The circuits 213 also include the circuit makers 163 mounted upon the platforms of the despatching stations to be actuated by articles resting thereon, and the circuit makers or switches 67 which are actuated by the arms 64 in Fig. 9 to break the circuit and as these arms are moved by the levers 44 to the position shown in Fig. 10 the levers 66 are released and the circuit is completed at this point. As the platforms 33 or 34 (Figs. 9, 10 and 11) return to their inclined or upper positions, they actuate a circuit breaker 222 interposed in the circuit 213 and thereby break this circuit. It will be understood that as soon as the button 212 is depressed, and assuming that the various switches and circuit makers 67 and 163 are in position to close the circuit, the same is completed through the relay 214 which closes the switches 216, 219 and 218. Closing of the switch 210 does not complete the circuit through the line 209 until an approaching car actuates the circuit maker 164, at which time the charging solenoid 208 of the timing device 167 is energized to render this apparatus effective so that after a predetermined time interval the switch 173 will be closed by this timing device, and as previously pointed out, this will cause the switch 171 to close and thereby energize the solenoid 166 to move the abutment means 158 (Fig. 14) into a position for engagement with an approaching car. As soon as the car passes the station to the uppermost position indicated by dot and dash lines in Fig. 14, the circuit breaker 176 will be actuated to break the circuit through the relay 178, thereby permitting the switch 171 to open and thus to deenergize the solenoid 176 and permit the abutment means 158 to return to its normal position wherein it is out of the path of travel of passing cars.

The switch 218 previously referred to is in a circuit 223 which leads from the main 181 through a circuit maker 224, a relay 226, and a circuit breaker 227 to the line 182. It will be understood that when the switch 218 is closed, and assuming that the circuit maker 224 has been actuated by an upgoing car approaching a despatch station, this circuit is completed through the relay 226 which actuates the switches 228 and 229 to close the same. The switch 229 when closed completes a circuit through the lead 231 through the motor 83 and back to the line through the wire 232. The solenoid 233 for actuating the solenoid brake 84 is connected across the terminals of the motor and is therefore energized to release the brake as the motor circuit is completed. As the arms 78 (Fig. 9), which carry the article engaging means 73, approach their position of rest after transferring an article as shown in Fig. 9, these arms actuate the circuit breaker 227 and thereby break the circuit through the holding relay 226, permitting the switches 228 and 229 to open so as to break the motor circuit and also the circuit through the solenoid 233 to stop this apparatus abruptly.

The corresponding circuit for stations on the downgoing side of the system is indicated as being connected from the main 181 through a lead 234 through a circuit maker 236, a relay 237, and a circuit breaker 238 to the main 182. It will be understood that when the circuit maker 236 is actuated by a downgoing car approaching a despatch station this circuit is completed through the relay 237 which actuates the switches 239 and 241, thereby completing a circuit from the main 181 through the lead 231 and the motor 83' in this instance and the lead 232 to the main 182. The solenoid brake 84' is again actuated as before. After the article engaging means 74 has been actuated to transfer an article onto a passing car and the arms 81 return to their position of rest substantially as shown in Fig. 9, these arms actuate the circuit breaker 238 which breaks the circuit through the holding relay 237 thereby causing the switches 239 and 241 to open and thus breaking the motor circuit. At this time the solenoid 233 is deenergized and the brake becomes effective to stop the motor 83' abruptly.

To avoid unduly complicating the various figures of the drawing and all unnecessary confusion, many of the switches, circuit makers, and circuit breakers shown in the wiring diagram just described have been omitted from Figs. 9, 10, and 11 of the drawing as it is believed that any man skilled in this art, when informed by this specification, will understand clearly the manner in which these parts are to be arranged when the apparatus is installed.

While two embodiments of this invention have been shown and described herein it will be understood that we are not limited thereto and that other embodiments may be made without departing from the spirit and scope of the invention as set forth in the following claims.

We claim:

1. A station for loading a vertically traveling elevator car comprising a pivotally mounted load support platform, the platform being movable about its pivotal mounting from an inclined position to an approximately horizontal position, means effective when the platform is in the latter position for engaging a vertically traveling elevator car to cause the platform to be moved by the car and substantially in unison therewith, and means for moving a load from the platform onto the car as the latter passes the platform.

2. In a system comprising a vertically traveling elevator car, the combination of an article transfer station comprising an article sustaining platform mounted for pivotal movement between a position out of the path of travel of the car and an article transferring position wherein an edge portion of the platform projects into the path of travel of the car to be movable by the latter on engagement therewith, means tending to return the platform and to maintain the same in the former of these positions, releasable means for locking the platform in this position, the platform being movable on release of the locking means and under the influence of the weight of an article resting thereon, to its article transferring position.

3. In a system comprising a vertically traveling elevator car, the combination of an article transfer station comprising an article sustaining platform movably mounted to move from an inclined position out of the path of travel of the car to an article transferring position wherein an outer portion of the platform intercepts the path of travel of the car and then to a further position out of the path of travel of the car, and yieldable means for holding the platform in the article transferring position, such means being sufficiently yieldable to permit the platform to move from the article transferring position to said further position.

4. In a system comprising a vertically traveling elevator car, the combination of an article transfer station comprising an article sustaining platform pivotally mounted to move between oppositely inclined positions out of the path of travel of the car through an article transferring position wherein the outer portion of the platform extends into the path of travel of the car, the platform being movable, under the influence of the weight of an article disposed thereon, from one of the inclined positions to the article transferring position, a lever engageable with the platform when the latter is in the article transferring position, the lever being capable of movement with the platform from the latter position to the other of the inclined positions, means tending to urge the lever toward the platform for holding the latter in the article transferring position, and means for limiting movement of the lever toward the platform so that the lever does not become effective until the platform arrives substantially at the article transferring position.

5. In a system comprising a vertically traveling elevator car, the combination of a movably mounted article receiving platform, this platform being movable from an inclined position out of the path of travel of the car to an article transferring position wherein the edge portion of the platform extends into the path of travel of the car, an article delivering chute depending above the platform, the delivery end of the chute being disposed at a height above the inclined position of the platform which height is less than that of articles to be delivered thereto so that the chute may be effective for holding a delivered article on the inclined platform, the wall of the chute adjacent the traveling car being cut away to permit articles to pass therethrough for delivery to the car, and means movable between the delivery end of the chute and the platform for moving an article across the platform through the cutaway portion of the chute and onto a passing car.

6. In a system comprising a vertically traveling elevator car, the combination of a pivotally mounted article receiving platform, this platform being movable about its pivotal mounting from an inclined position out of the path of travel of the car to an article transferring position wherein the edge portion of the platform extends into the path of travel of the car, an article delivering chute depending above the platform, the delivery end of the chute being disposed at a height above the inclined position of the platform which height is less than that of articles to be delivered thereto so that the chute may be effective for holding a delivered article on the inclined platform, the wall of the chute adjacent the traveling car being cut away to permit articles to pass therethrough for delivery to the car, releasable means for locking the platform in the inclined position, the platform being otherwise movable, under the influence of the weight of an article disposed thereon, to the article transferring position, and means effective on release of the releasable locking means for obstructing the chute at a point above an article disposed on the platform for preventing delivery of another article until transfer of the first is effected.

7. In a system comprising a vertically traveling elevator car, the combination of a pivotally mounted article receiving platform, this platform being movable about its pivot between an inclined position out of the path of travel of the car to an article transferring position wherein an edge portion of the platform substantially registers with a passing car, an article delivering chute having its delivery end spaced above the inclined position of the platform for delivering articles thereto, releasable means for locking the platform in the inclined position, the platform being otherwise movable, under the influence of the weight of an article disposed thereon, to the article transferring position, means effective on release of the releasable locking means for obstructing the chute to prevent delivery of another article before one such article has been removed from the platform, article engaging means movable beneath the chute from one side thereof across the platform, means for causing the article engaging means to travel from said one side of the chute across the platform and to return to a position of rest at said one side of the chute, means effective on the initiation of this movement for locking the releasable locking means in its release position, and means effective as the article engaging means returns to its position of rest for unlocking the releasable locking means from its release position.

8. In a conveyer system comprising a vertically traveling elevator car, an article loading station comprising a cabinet having a plurality of inlets in an upper wall thereof, a chute depending from each inlet, a pivotally mounted platform disposed below each chute, each platform being movable between an upwardly inclined article receiving position and a lower article transferring position, each platform having a portion extending rearwardly beyond the pivotal mounting thereof, a counterbalance weight on this rearwardly extending portion, a rotary shaft disposed along the rear sides of the platforms, an operating lever fast on this shaft and projecting outside the cabinet, a plurality of arms fast on the rotary shaft and spaced for engagement with the rearwardly extending portions of the platforms, means tending to hold the rotary shaft in a position to maintain the arms above the rearwardly extending portions of the platforms for locking the latter in their upwardly inclined positions, the arms being movable on operation of the lever to a position to the rear of the rearwardly extending portions of the platforms so that the latter may descend to their article transferring positions, a rod connected to the operating lever and disposed substantially parallel to the rotary shaft, each chute having an opening approximately opposite this rod, bars pivotally mounted on the rod and spaced therealong for movement through these openings, the parts being so constructed and arranged that, when the operating lever is actuated to remove the arms from their positions above the rearwardly extending portions of the platforms, the bars are moved into the chutes to obstruct the passage of articles therethrough.

9. In a system of the class described, an article loading station comprising a pivotally mounted platform movable from an upper article receiving position to a lower article transferring position, a rock shaft, an arm fast on this shaft and movable into the path of movement of the platform for holding the latter in its upper position, a cam fast on the rock shaft, a latch engageable with the cam for holding the shaft in position to keep the arm out of the path of movement of the platform, means tending to urge the latch into engagement with the cam, article engaging means movable from a position of rest at the rear of the platform across the latter for transferring articles therefrom, the article engaging means being engageable with the latch when in said position of rest for holding the latch out of engagement with the cam as well as for releasing the latch from the cam as the article engaging means returns to such position.

10. In a conveyer system, the combination of a traveling car, an article loading station adjacent the path of travel of the car, the station comprising an article receiving platform, means for supporting the platform for movement from an upper article receiving position spaced from the path of travel of the car to a lower article transferring position wherein the outer edge of the platform substantially registers with a passing car, abutment means effective in one position for holding the platform in the upper position, the abutment means being movable to another position to permit the platform to descend to the article transferring position, a member for moving the abutment means, article engaging means for moving an article from the platform onto a passing car, a motor for actuating the article engaging means, an electrical circuit for controlling the motor, a circuit maker in this circuit and disposed in the path of cars approaching the station to be actuated by engagement with such cars, a switch in this circuit, and means for closing the switch as said member is actuated to remove the abutment means from said one position, the switch being open when the abutment means is in the latter position.

11. In a conveyer system, the combination of a traveling car, an article loading station adjacent the path of travel of the car, the station comprising an article receiving platform, means for supporting the platform for movement between an upper article receiving position spaced from the path of travel of the car and a lower article transferring position wherein an outer edge of the platform substantially registers with a passing car, a chute for delivering articles to the platform, movable means for obstructing the chute, releasable means for locking the platform in its upper position, means for concomitantly actuating the movable means to obstruct the delivery chute and for releasing the releasable locking means so that the platform may descend to its article transferring position, and means thereafter effective for transferring an article from the platform onto a passing car.

12. An article loading station comprising a platform for receiving articles to be loaded, an arm mounted to pivot, article engaging means carried by the arm and adapted to swing across the platform for removing articles therefrom, and means for imparting an oscillatory motion to the arm for transferring articles from the platform.

13. A conveyer system comprising a vertically traveling car, a transfer station adjacent the path of travel of the car, oscillatory ejecting means carried by the car and movable transversely substantially from side to side thereof, abutments spaced alternately along the sides of the path of travel of a car approaching the station, the first abutment being engageable with the ejecting means for moving the latter to one side of the car to eject an article at the first platform, the second abutment being thereafter engageable with the ejecting means for returning the latter to the other side of the car.

14. In a car for conveying materials vertically, the combination of means providing a compartment having open ends, a member carried by the car and movable through the compartment between the ends thereof for ejecting material therefrom, and means tending to maintain said member adjacent either of the ends of the compartment in position for traversing the latter and thereby ejecting material therefrom.

15. A car comprising a frame having open sides for receiving and discharging articles laterally, substantially vertical transverse partition members extending between the sides to provide a plurality of article carrying compartments, a shaft extending beneath the compartments and fixed to the frame, a plurality of blocks rotatably supported on the shaft, there being one block for each compartment, arms extending upwardly from the blocks into the compartments, article engaging means carried by these arms, and means for causing the blocks to rock about the shaft and thereby causing the article engaging means to traverse the compartments for removing articles therefrom.

16. A car comprising a frame having open sides for receiving and discharging articles laterally, substantially vertical transverse partition members extending between the sides to provide a plurality of compartments having open ends, a rotary block below each compartment, arms extending upwardly from each block along the side walls of each compartment, article engaging means carried by these arms, a pair of arms affixed to each block and extending substantially perpendicularly to the upwardly extending arms, the arms of this pair being of substantially the same length and each extending for substantially the same distance on either side of the block, one of the latter arms being disposed above the axis of the block and the other being disposed below this axis.

17. In a vertical conveyer system comprising a car having a substantially vertical course of travel, an article despatching station and a plurality of article receiving stations disposed along the course of travel of the car, the combination of article ejecting means carried by the car for transferring articles from the car to the receiving stations, movable abutment means disposed substantially at each receiving station for actuating the article ejecting means, the abutment means being normally disposed in a position to clear the article ejecting means, and means at the despatching station operable as the car passes this station for moving the abutment means at a predetermined receiving station into a position to actuate the article ejecting means as the car passes that station.

18. In a vertical conveyer system comprising a car having a substantially vertical course of travel, an article despatching station and a plurality of article receiving stations disposed along this course of travel, the combination of article ejecting means carried by the car for transferring articles therefrom to the receiving stations, movable abutment means disposed substantially at each receiving station for actuating the article ejecting means, the abutment means being disposed normally in a position to clear the article ejecting means, a timing device for actuating the abutment means at a selected receiving station after a predetermined time interval to cause that abutment means to move into a position to actuate the article ejecting means as the car passes that station, and means at the despatching station for actuating the timing device as the car passes this station.

19. In a vertical conveyer system comprising a car having a substantially vertical course of travel, an article despatching station and a plurality of article receiving stations disposed along this course of travel, the combination of article ejecting means carried by the car for transferring articles therefrom to the receiving stations, movable abutment means disposed substantially at the receiving stations for actuating the article ejecting means, the abutment means being disposed normally in a position to clear the article ejecting means, a timing device for actuating a predetermined abutment means to move the latter into a position to actuate the article ejecting means as the car passes a certain receiving station, a normally open electrical circuit for rendering the timing device effective, a circuit maker in this circuit and disposed in the path of a car approaching the despatching station to be actuated by such car in passing this station, and manually operable means at the despatching station for completing the circuit as a car passes this station.

20. A vertical conveyer system having a well in which a car is adapted to travel upwardly in one path and downwardly in another path, unloading mechanism carried by the car and stations adjacent both the upward and downward paths of the car, each station including means for loading the car, and means for actuating the unloading mechanism carried by the car whereby the car receives loads at one station and delivers them to other stations on its upward travel and similarly on its downward travel.

21. A vertical conveyer system having a well in which cars are adapted to travel upwardly in one path and downwardly in another path, and stations adjacent both the upward and downward paths of the cars, each car having a plurality of compartments, each compartment being assigned to at least one station in each path, each station including a plurality of means for loading one or more compartments of the cars, which means may be selectively operated in accordance with the destination of the loads, and means for unloading those compartments of the cars assigned to such station whereby articles to be sent to any definite station in either path are loaded into the compartments assigned thereto, at any station in the path reached by the cars in advance of the definite station and are unloaded upon the arrivals of the cars at such definite station.

22. An article loading station comprising a platform for receiving articles to be loaded, said platform being movable between an article receiving position and an article loading position, an arm for moving articles from said platform when it is in the loading position, and means for operating said arm when the platform is in the article loading position.

SIMEON T. HART.
WILLARD A. MARCY.